April 30, 1935.  C. L. DUFF  1,999,448
PORTABLE UNLOADER
Filed March 3, 1931
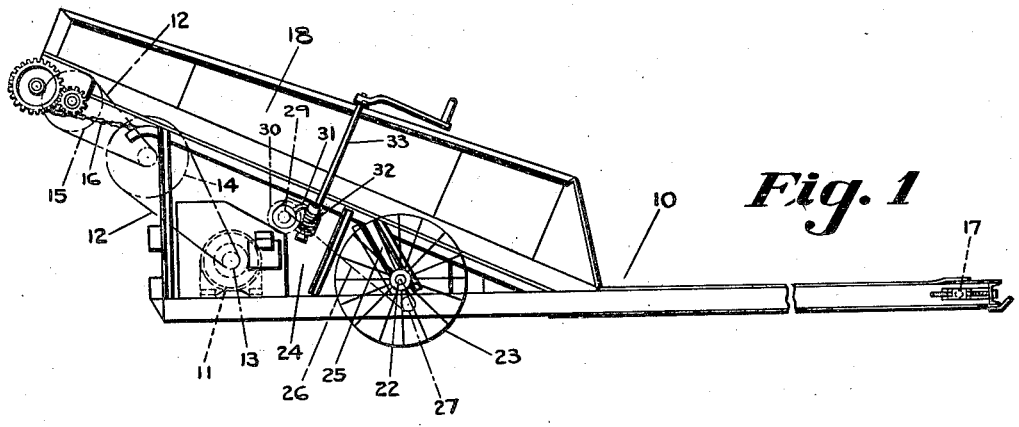
Fig. 1
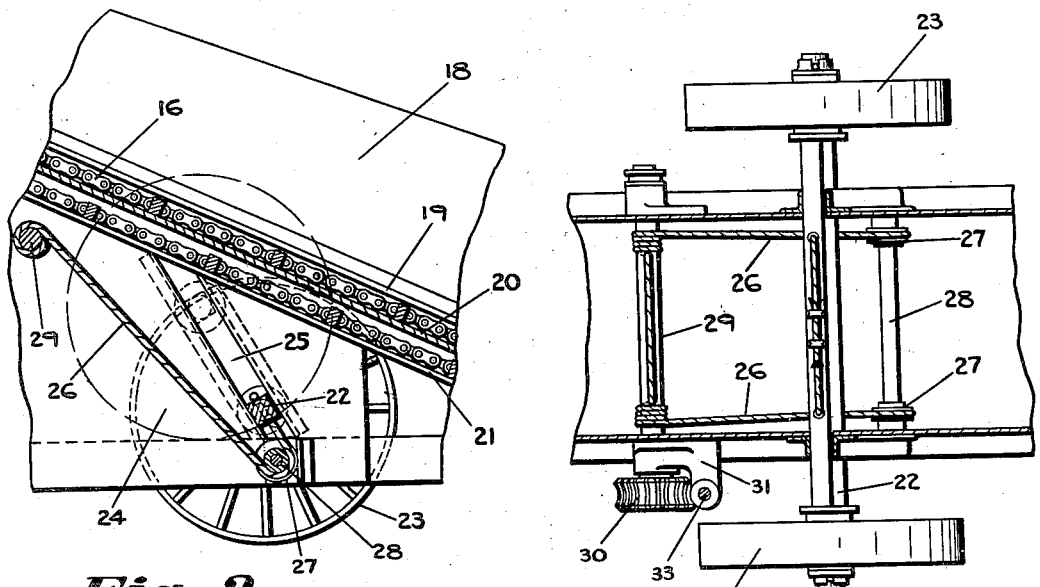
Fig. 3
Fig. 2
INVENTOR
Charles L. Duff Patented Apr. 30, 1935

1,999,448

UNITED STATES PATENT OFFICE 1,999,448

PORTABLE UNLOADER

Charles L. Duff, Columbus, Ohio, assignor to The Jeffrey Manufacturing Company, Columbus, Ohio, a corporation of Ohio Application March 3, 1931, Serial No. 519,851

4 Claims. (Cl. 280—44)

This invention relates to raising and lowering devices for conveyors, it being here shown as applied to a conveyor adapted for the unloading of cars, which type of conveyor is characterized by a conveyor frame which may be inserted beneath the trap of a car and which will withdraw, by the usual or any desired conveyor chain, the contents dumped upon it, there being provided as a part of the mechanism an inclined conveyor frame, up which the material will be carried by the chain to an elevation which will permit it to be delivered to the truck for transportation.

The invention has to do particularly with novel means for raising and lowering the conveyor frame relative to the supporting wheels on which it is carried and transported.

In the drawing is disclosed one embodiment of the invention, but it will be understood that the disclosure is illustrative and in no sense restrictive, as equivalent mechanical expedients may be adopted for those shown, and still be within the range of the invention.

In the drawing:—

Figure 1 is a view in side elevation of a machine having my invention applied thereto.

Figure 2 is a view in bottom plan of a portion of the machine to illustrate the raising and lowering mechanism.

Figure 3 is a view in longitudinal section through a portion of the machine to illustrate the raising and lowering mechanism and its operation.

Referring to the drawing by numbers, like numbers indicating like parts in the several views, 10 indicates the frame of the machine, which may be of any suitable construction, there being provided at the rear of the machine, mounted upon a suitable super-structure, any prime motor 11, from the shaft of which motor, driving connections, made up of drive belts or chains 12 and suitable pulleys or sprockets 13, carry the power to a sprocket 14, which, in turn, drives, through the sprocket 15, the head shaft of the conveyor for actuating the conveyor chain.

The conveyor chain 16, which may be of any suitable type, extends from the horizontal portion of the frame 10, where it passes over any suitable foot shaft 17, adjustably mounted at the end of the frame 10, rearwardly and up the inclined bottom of the conveyor trough 18, which may be of any suitable or desired construction. The one here shown, as illustrated in Figure 3, comprises the endless chain 16, traversing suitable guideways 19 in the sides of the conveyor frame, the upper run of the chain travelling over the false bottom or apron 20, while the lower run of the chain passes on its return flight along suitable guides 21.

With this construction, the forward end of the frame 10, with its conveyor, will be thrust beneath the car, the traps opened, and the material which flows from the car will then be carried rearwardly, when power is applied, by the conveyor chain 16, up the inclined trough, and delivered at the rear end of any suitable receptacle or carrier.

It is necessary or desirable that the conveyor be arranged for ready transportation, and this is accomplished by providing a wheeled axle 22, at each end of which are journaled the supporting wheels 23. The axle is placed so that the load will be evenly distributed and the machine kept at a reasonable balance for operation and transportation.

It is necessary, to a satisfactory manipulation of the machine, that provision be made for raising and lowering it so as to accommodate it to the different conditions under which it is to be used, at the same time preserving the integrity of the conveying mechanism and the driving parts and avoiding, so far as possible, the necessity of making laborious and slow adjustments for elevating and lowering the machine.

This is accomplished, according to my invention, by providing a frame, 24, made up of suitable plates and cross bars, which frame 24 depends from the inclined trough member and is suitably secured to the horizontal frame member 10, as shown in Figures 1 and 3. The frame 24 is provided on each side with open ways 25, suitably flanged, as shown in Figures 2 and 3, to give a bearing surface for an appreciable extent, and in these open ways the axle 22 slides, so that the axle and its wheels may be adjusted, as shown in Figure 3, to a variety of positions, so as to raise and lower the frame of the machine relative to the supporting axle. It will be seen that in the present construction the axle 22 is non-circular in cross section and takes its bearing on two sides upon the flanged ways 25, so that it can move up and down the ways without turning, and the parts will be maintained in relatively firm relation.

In order to bring about the shifting of the frame and the axle relative to one another, there is provided, as here shown, a very simple and efficient mechanism, comprising the rope or cable 26, the ends of one end loop of which is secured directly to the axle, it being here shown as passing through apertures in the axle 22 and having its adjacent ends or its loop fastened so that it will be held against movement or slip under strain. From the axles, the bight of the cable 26 passes over sheaves 27, carried by a shaft 28, journaled in the frame of the machine below the axle, and thence the bight of the cable passes to, and is wound around, a shaft 29, conveniently mounted on the frame work of the machine. With this arrangement, it will be seen that as the shaft 29 is turned in the direction to wind the rope 26, it will exert a raising pull upon the sheaves 27 and tend to elevate the machine frame relative to the fixed point, namely, the axle 22 supported by the wheels, to which the ends of the rope are secured. Rotation of the shaft 29 in the opposite direction will permit the frame to slide downwardly relative to the shaft until it is brought to its extreme lower position or any intermediate elevation which may be desired.

When the cable has been wound upon the shaft 29 to the extent of bringing the axle into contact with the upper edges of the side rails 18, it will be seen that the wheels 23 will project the greatest degree below the conveyor frame to support the same at its highest elevation. When the axle is disposed at the opposite end of its guide slots 25, it will engage the underside of the inclined conveyor trough, so that it will be obvious that the machine is, in effect, equipped with stops for limiting the extent of sliding movement of the axle in either direction.

As a convenient means of rotating the shaft 29, and, furthermore, to lock it in any position of adjustment, there is preferably provided the worm wheel 30 on the end of the shaft 29, adjacent which is a bracket 31, in which is mounted a worm 32, carried by a crank shaft 33 fixed to the side of the inclined frame 18.

With this arrangement the operator of the machine can quickly elevate and lower the machine relative to the supporting axle 22 and adapt the conveyor proper to varying conditions which may be encountered.

It is to be understood that various changes in the arrangement and shape of the various parts may be resorted to without departing from the scope of the appended claims.

I claim:

1. In conveyor mechanism comprising a portable conveyor frame having a horizontal forward portion and an upwardly and rearwardly inclined rear portion, the combination of means beneath said rear portion providing transversely spaced parallel slots inclined upwardly and rearwardly, a wheeled axle in said slots, the frame being movable upwardly and downwardly relative to said axle with the latter guided in said slots, said slots being located in the vicinity of the balancing center of the mechanism as a whole and causing a forward overbalancing effect of the mechanism as the frame moves downwardly relative to the axle, and means for elevating the frame relative to said axle.

2. In conveyor mechanism comprising a portable conveyor frame having a horizontal forward portion and an upwardly and rearwardly inclined rear portion, the combination of means beneath said rear portion providing transversely spaced parallel slots inclined upwardly and rearwardly, a wheeled axle in said slots, said axle having flattened portions slidably and non-rotatably guided in said slots, the frame being movable upwardly and downwardly relative to said axle with the latter guided in said slots, said slots being located in the vicinity of the balancing center of the mechanism as a whole and causing a forward overbalancing effect of the mechanism as the frame moves downwardly relative to the axle, and means for elevating the frame relative to said axle.

3. In conveyor mechanism comprising a portable conveyor frame having a horizontal forward portion and an upwardly and rearwardly inclined rear portion, the combination of means beneath said rear portion providing transversely spaced parallel slots inclined upwardly and rearwardly, a wheeled axle in said slots, the frame being movable upwardly and downwardly relative to said axle with the latter guided in said slots, said slots being located in the vicinity of the balancing center of the mechanism as a whole and causing a forward overbalancing effect of the mechanism as the frame moves downwardly relative to said axle, means for elevating the frame relative to said axle comprising a lockable winding shaft journaled in connection with said frame parallel to and to the rear of said axle, and flexible means windable on said shaft and trained downwardly therefrom and upwardly to said axle at substantially the same inclination as that of the slots and secured to the axle at longitudinally spaced points thereon.

4. In conveyor mechanism comprising a portable conveyor frame having a horizontal forward portion and an upwardly and rearwardly inclined rear portion, the combination of means beneath said rear portion providing transversely spaced parallel slots inclined upwardly and rearwardly, a wheeled axle in said slots, said axle having flattened portions slidably and non-rotatably guided in said slots, the frame being movable upwardly and downwardly relative to said axle with the latter guided in said slots, said slots being located in the vicinity of the balancing center of the mechanism as a whole and causing a forward overbalancing effect of the mechanism as the frame moves downwardly relative to the axle, means for elevating the frame relative to said axle comprising a lockable winding shaft in connection with said frame parallel to and to the rear of said axle, and flexible means windable on said shaft and trained downwardly therefrom and upwardly to said axle at substantially the same inclination as that of the slots and secured to the axle at longitudinally spaced points thereon.

CHARLES L. DUFF.